Jan. 6, 1925.
H. T. SCHERMERHORN
1,521,907
CHECK WRITER
Filed Dec. 13, 1922   3 Sheets-Sheet 1
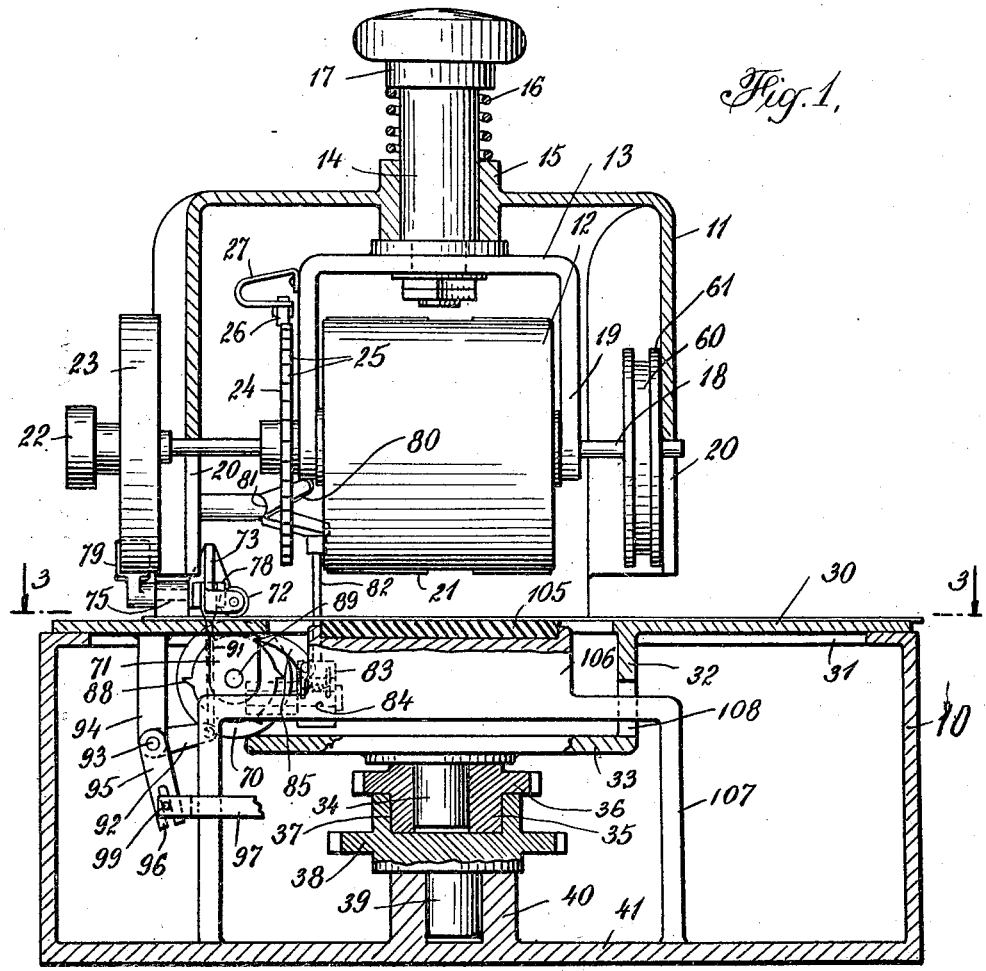
Fig. 1.
Fig. 6.
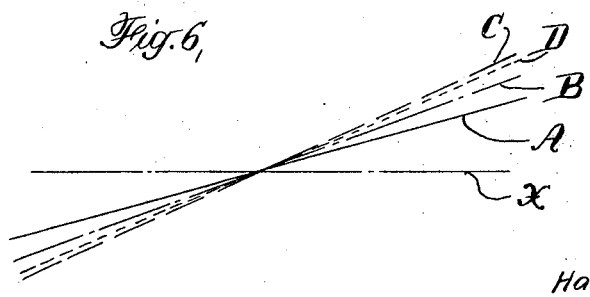
INVENTOR
Harry T. Schermerhorn
BY
ATTORNEY

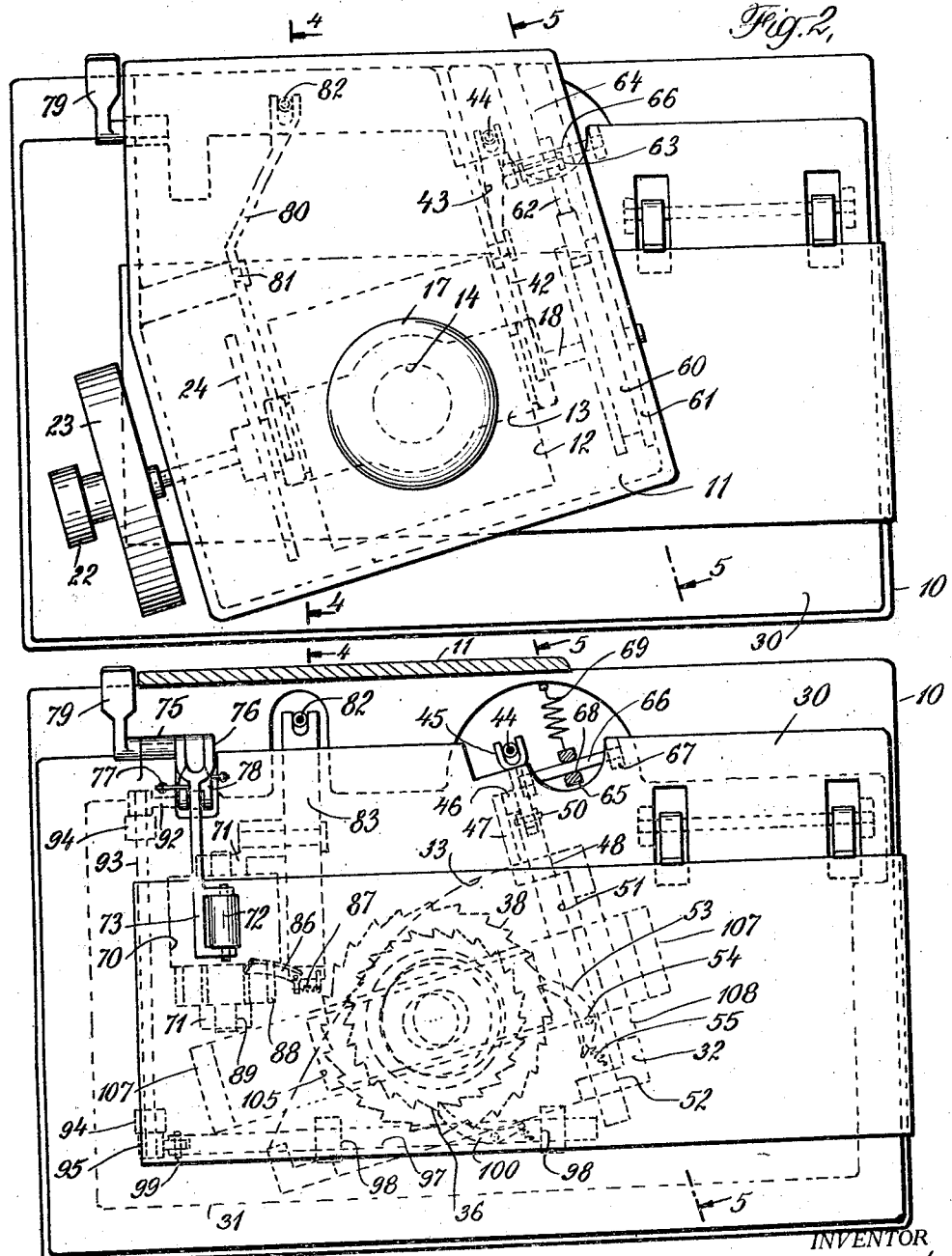

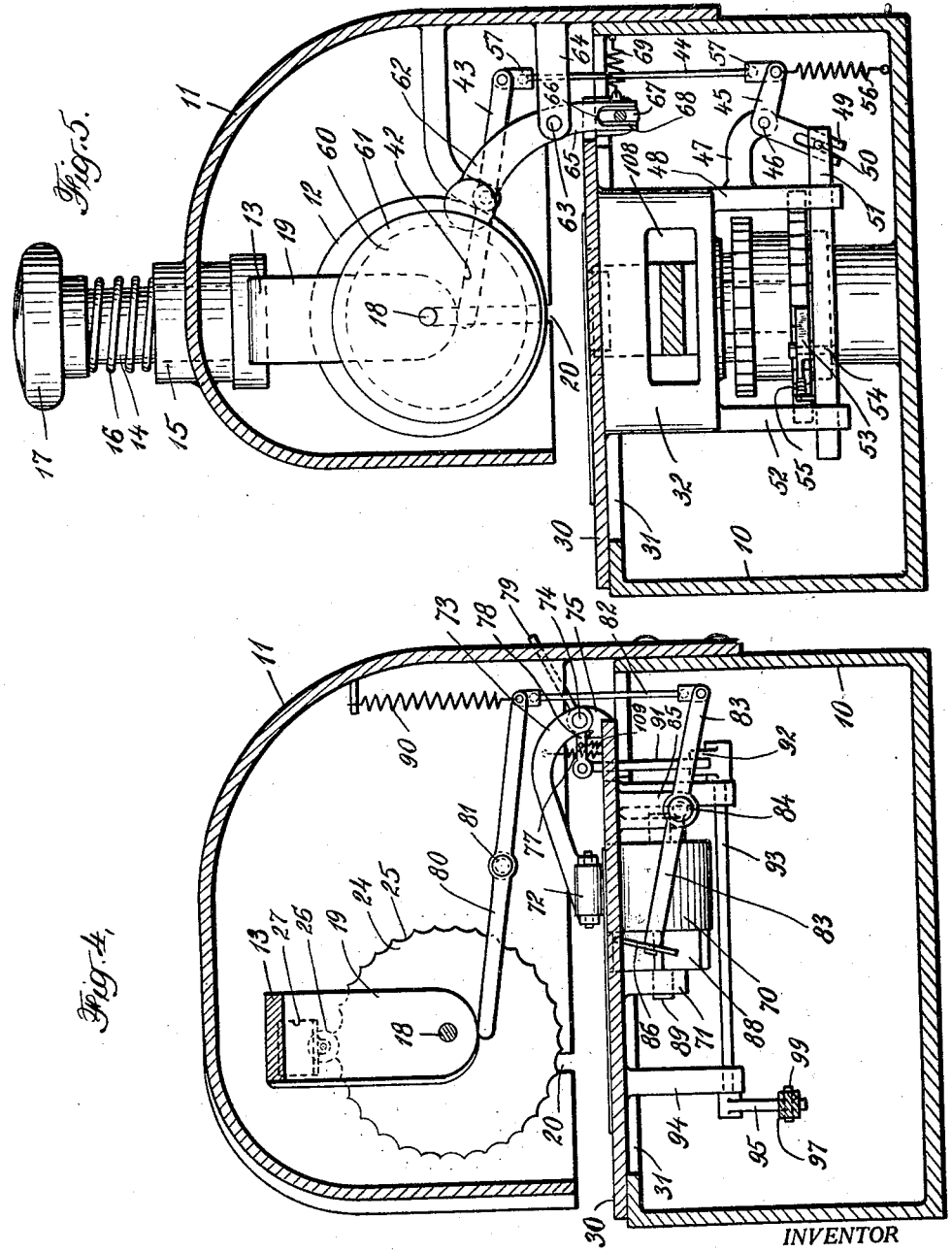

Patented Jan. 6, 1925.

1,521,907

UNITED STATES PATENT OFFICE.

HARRY T. SCHERMERHORN, OF HAWTHORNE, NEW JERSEY.

CHECK WRITER.

Application filed December 13, 1922. Serial No. 606,651.

*To all whom it may concern:*

Be it known that I, HARRY T. SCHERMERHORN, a citizen of the United States, and a resident of Hawthorne, county of Passaic, and State of New Jersey, have invented certain new and useful Improvements in Check Writers, of which the following is a specification.

This invention relates to safety check writing devices.

There are many forms of check writers now in use by means of which the amount of money for which the check is drawn is impressed in or printed on the body of the check in some suitable manner as by figures, words, or both. In all of these devices, however, so far as is known the marks on the check indicating the amount thereof are made in a straight line, in parallel lines, or at regularly spaced positions, and such location of the impressions or marks facilitates "raising" the check since if the position of the check when a certain mark or impression is made is noted or fixed in some way, the impression or mark can be voided or removed by pressure on the check paper or in some other manner and the check can be replaced in the machine in the same position as when the impression was made. A new impression can then be made indicating a larger amount than was first indicated.

This invention has for its salient object to provide a check writer so constructed and arranged as to render difficult or impossible the alteration of a check written by the device.

Another object of the invention is to provide a check writer so constructed and arranged that each successive operation of the device will make an impression or mark on the check irregularly disposed with reference to the preceding impression or mark.

Another object of the invention is to provide a check writer or protector so constructed and arranged that each operation of the device will effect relative angular movement between the check and the indicia on the writing device whereby no two successive impressions will be disposed parallel or in alinement with each other.

Another object of the invention is to provide a check writer having a check support and an impression device so constructed and arranged that the check support and check will be angularly displaced upon successive actuations of the impression device.

Another object of the invention is to provide a check writer having a check support and an impression device so constructed and arranged that the check support and check will be angularly displaced each time that the impression device is adjusted to bring different indicia thereon into operative position.

Another object of the invention is to provide a check writer having an impression device and a check support so relatively constructed and arranged that the check support and check will be irregularly and angularly displaced upon successive actuations of the device thereby rendering it practically impossible to predetermine at any time the position of the check.

Another object of the invention is to provide a check writer having an impression device and check support and a plurality of independently operable means for angularly displacing the check support.

Another object of the invention is to provide a check writer with check feeding mechanism so constructed and arranged that the check cannot be fed until the impression device has been moved into impression engagement with the check.

Further objects of the invention will appear from the following specification taken in connection with the drawings, which form a part of this application, and in which—

Fig. 1 is an irregular longitudinal section of a device constructed in accordance with the invention.

Fig. 2 is a top plan view of the construction shown in Fig. 1.

Fig. 3 is a sectional elevation taken substantially on line 3—3 of Fig. 1 showing the base, check supporting surface and illustrating in dotted lines the operative parts carried by the base and check supporting surface.

Fig. 4 is a sectional elevation taken substantially on line 4—4 of Figs. 2 and 3.

Fig. 5 is a transverse sectional elevation taken substantially on line 5—5 of Figs. 2 and 3, and Fig. 6 is a diagrammatic view showing the different positions of the check and check supporting surface due to the several displacing movements thereof, The invention briefly described consists of a check writer comprising an impression device, check supporting means and a plurality of means for displacing the check supporting surface and check relative to the axis of the impression device. In the embodiment of the invention illustrated these displacing means are operated in several different ways such as by the downward movement of the impression device, by the rotation of the roll of the impression device to bring into position any desired indicia, and by the separating means for separating the pressure roll from the feed roll. It will be understood that although a plurality of independently operable means has been illustrated, any one of the means may be used alone and that the check support will be displaced a sufficient amount to effectively prevent the superimposing of one impression upon another.

Referring to the drawings, the check writer comprises a base 10 and a casing 11 housing the impression device which in the embodiment of the invention shown comprises a roll 12 rotatably mounted in a yoke 13 and the yoke is carried by a vertical spindle 14 reciprocably mounted in a bearing 15 formed on the casing 11. A spring 16 surrounds the spindle 14 and is interposed between the upper end of the bearing 15 and a handle 17 secured to the upper end of the spindle 14. The spring normally retains the impression device in raised position.

The roll 12 is secured to a shaft 18 rotatably mounted in arms 19 of the yoke 13 and the shaft extends outwardly through the ends of the casing, the outer end portions being disposed in slots 20 formed in the casing and permitting vertical movement of the shaft. The roll 12 has secured to its outer surface suitable indicia 21 for impressing on the check various amounts for which the check may be drawn and in order to bring any desired indicating mark or indicia into operative position, the roll 12 and shaft 18 can be rotated by a handle 22 secured to one end of the shaft. An indicating disk 23 is secured to the shaft adjacent the handle 22 and has printed or otherwise placed thereon indicia corresponding to the indicia on the roll 12. Means is provided for retaining the roll in its various positions of adjustment and this means comprises a disk 24 secured to the shaft 18 and having on its periphery a plurality of depressions 25 for receiving a roller 26 carried by a resilient bracket 27 which in turn is secured to the yoke 13.

The check support 30 is movably mounted and means has been provided for angularly displacing this support by a plurality of different mechanisms.

As illustrated in the drawings, the base 10 has a longitudinal opening 31 formed in its upper surface and the check support 30 is mounted above this opening and the operating mechanism for moving or displacing the check support extends downwardly through the opening 31.

The check support 30 has formed thereon or secured thereto a downwardly extending elongated lug 32 and the portion 32 has formed thereon an elongated ledge 33 which, as shown in Fig. 3, is substantially triangular in shape.

The ledge 33 has secured thereto or formed thereon a downwardly extending stud 34 which is eccentrically mounted in the hub 35 of the ratchet wheel 36. The hub 35 of the ratchet wheel 36 is in turn eccentrically journaled in an annular extension 37 of a ratchet wheel 38 and the ratchet wheel 38 has eccentrically secured thereto a downwardly extending stud 39 which in turn is journaled in a bearing 40 secured to and extending upwardly from the lower end or bottom 41 of the base 10. It will thus be seen that the check support 30 is movably mounted and is carried through the eccentric bearings by the base 10. Means is provided for rotating the ratchet wheels step by step upon successive actuations of the impression device and upon the separation of the pressure roll from the feed rolls hereinafter described.

One mechanism for displacing the support 30 is set in operation by the downward movement of the impression device and this mechanism will first be described and comprises a lever having one arm 42 positioned beneath and in engagement with the lower end of one of the yoke arms 19 and having its other arm 43 connected by a link 44 to a bell crank lever 45 pivoted at 46 to a lug 47 formed on a downwardly extending portion 48 of the elongated lug 32. The bell crank lever 45 has a forked end 49 connected by a pin 50 to a slide bar 51 and the bar 51 is slidably mounted in the extension 48 and a corresponding extension 52 also formed on the lug 32. A pawl 53 is pivoted at 54 to the bar 51 and engages the teeth of the ratchet wheel 38 being retained in engagement with the ratchet wheel by a spring 55. A spring 56 is secured at one end of the bottom 41 of the base and at its opposite end to the bell crank lever 45. The link 44 is connected to the arm 43 of the bell crank lever 45 by universal joints 57 since the angular displacement of the support 30 and the parts carried thereby changes the relative positions of the arm 43 and the bell crank lever 45. From the foregoing description it will be seen that as the impression device is depressed the lever 42, 43 will be swung on its pivot thereby through the instrumentality of the link 44 and bell crank 45 moving the slide bar 51 longitudinally and by means of the pawl 53 carried by the slide bar rotating the ratchet wheel and angularly displacing the check support by reason of the eccentric connection of the stud 39 to the ratchet wheel 38.

Means has also been provided for displacing the check support 30 when the roll 12 of the impression device is rotated to bring any desired indicia into operative position. For this purpose a cam 60 is secured to the shaft 18 and is provided with flanges 61 for retaining the upper end of an arm 62 in engagement with the cam. The arm 62 is pivoted at 63 to a lug 64 formed on or secured to the casing 11. The lower end 65 of the arm 62 below the pivot 63 is bifurcated, as shown in Figs. 3 and 5, and this bifurcated end straddles a pin 66 secured to lugs 67 formed on and extending downwardly from the check support 30. As shown in Fig. 3, the bifurcated portion of the lower end 65 of the arm 62 is rounded at 68 to permit a rocking movement of the pin 66 between the bifurcated ends. A spring 69 is secured to the lower end portion 65 of the arm 62 and also to the base 10 and this spring retains the upper end of the arm 62 in engagement with the cam surface of the cam 60. From the foregoing description it will be seen that when the operator rotates the roll to set the impression device in the desired position, the arm 62 will be swung about its pivot 63 by the cam 60 thereby moving the check supporting surface 30.

The mechanism for rotating the ratchet wheel 36 will next be described. This mechanism is adapted to be operated in conjunction with the means for releasing the pressure roll from the feed roll and will, therefore, be described in connection with the check feeding mechanism. The check feeding mechanism comprises a feed roll 70 journaled in lugs 71 extending downwardly from the check support 30 and a pressure roll 72 rotatably mounted in an arm 73 pivoted on a pin 74 mounted in a lug 75 carried by and extending upwardly from the support 30. The pivoted end of the arm 73 is bifurcated as shown at 76 and this arm is resiliently actuated in a downward direction by a spring 77 secured to the arm and to the check support 30. An arm 78 is secured to the pin 74 and extends between the bifurcated ends 76 of the arms 73. An arm or handle 79 is secured to the end of the pin 74 in a position to be engaged by the operator. From the showing in Fig. 4 it will be seen that when the handle 79 is depressed the arm 78 will be raised and after this arm has been raised a predetermined amount the arm will engage the under surface of the arm 73 and will raise the pressure roll 72 from engagement with the feed roll 70.

The feed roll is rotated step by step by means of a lever 80 pivoted to a stud 81 formed on the casing 11. The lever 80 has one end disposed beneath and engaged by the lower end of one of the arms 19 of the impression device yoke 13. The other end of the lever 80 is connected by a link 82 to a lever 83 pivoted at 84 on a lug 85 and formed on and extending downwardly from the support 30. The other end of the lever 83 has pivoted thereon a pawl 86 resiliently actuated by a spring 87 to engage the teeth of a ratchet wheel 88 which in turn is secured to the shaft 89 on which the feed roll 70 is mounted. The pawl, ratchet teeth and levers are so relatively dimensioned and constructed and arranged that a full downward movement of the impression device and engagement of the indicia on the impression device with the check is necessary to position the pawl 86 operatively with reference to one of the teeth of the ratchet wheel 88. In other words, unless the impression device is depressed completely and to the fullest extent possible the pawl will not be retracted a sufficient extent to engage over a tooth so that upon the return movement of the lever 81 under the action of the spring 90, the feed roller 70 will be rotated to feed the check. This is particularly important since it is very essential that a check be fed only after an impression has been made thereon.

The means for rotating the ratchet wheel 36 in conjunction with the separation of the pressure roll 72 from the feed roll 70 comprises a link 91 connected at its upper end to the arm 78 and at its lower end to an arm 92 which in turn is connected to a shaft 93 rotatably mounted in lugs 94 and secured to and depending from the check support 30. An arm 95 is secured to the opposite end of the shaft 93 and is bifurcated at its lower end as shown at 96. A slide bar 97 is slidably mounted in lugs 98 carried by the check support 30 and has secured to one end a pin 99 which is positioned in the bifurcated lower end 96 of the arm 95. A pawl 100 is pivotally mounted on the slide bar 97 and engages the teeth of the ratchet wheel 36. Therefore, as the handle 79 is depressed, raising the arm 78, the link 91 will oscillate the shaft 93 and through the arm 95 will cause the slide bar 97 to move longitudinally thereby through the instrumentality of the pawl 100 rotating the ratchet wheel 36. As this ratchet wheel is rotated, the check support 30 will be angularly displaced due to the eccentric mounting of the stud 37 carried by the check support in the hub 35 of the ratchet wheel.

Any desired form of platen may be used with the impression roll and in the particular form of the invention shown a platen 105 is carried by a support 106 which in turn is connected to the bottom 41 of the base 10 by upright supporting members 107. One of these members as shown in Figs. 1 and 5, extends through a slot 108 in the elongated lug 32.

From the foregoing description it will be noted that practically all the operative parts for displacing the check support 30 are carried by the support and are movable therewith and further it will be seen that the check support is movably carried by the base 10.

The operations of the various check support displacing mechanism will now be briefly set forth.

In the first place, the impression roll 12 will be rotated to bring the desired indicia to operative position and as this roll is rotated the cam 60 will also be rotated thereby swinging the arm 62 about its pivot 63 and through the connection between the lower end of this arm with the check support, the check support will be displaced. As the impression device is depressed, the arm 62 will remain in engagement with the cam and the parts are so dimensioned and constructed that as the impression device engages the check there will be substantially no relative movement between the check support and the device. When the impression device is depressed, the lever 42, 43 will be rotated on its pivot thereby longitudinally moving the slide bar 51 in the manner hereinbefore described and rotating the ratchet wheel 38. As this wheel is rotated, the check support will be displaced due to the eccentric connection between the stud 39 and the ratchet wheel, the stud being journaled in the fixed bearing 40 on the base. When the operator lifts the pressure roll 70 to free the check, the arm 78 will be raised against the tension of a spring 109 and as this arm is raised the other slide bar 97 will be actuated in the manner hereinbefore described to rotate the ratchet wheel 36 and further displace the check support. This displacement of the check support will take place prior to the separation of the roll 72 from the roll 70 since the roll 72 will not be raised until the arm 78 engages the under surface of the arm 73 by which the roll 72 is carried. It will not be possible, therefore, to separate the rolls without displacing the check support.

It should be understood that although a plurality of different mechanisms have been shown for displacing the check support, it is not necessary to utilize all of the mechanisms but any one of them may be used alone and, if used alone, will effectively displace the check support thereby rendering it difficult, if not impossible, to superimpose one impression upon another.

Fig. 6 illustrates diagrammatically the various displacements of the check support and check. The full line A may be taken to represent the normal position of the impression on the check relative to the longitudinal axis of the check. The dot and dash line B may represent the position of the indicia or impression due to the displacement effected by the cam 60 and the parts operated thereby. The dash line C may represent the position of the impression after the check support has been displaced by the lever 42, 43 and ratchet wheel 38, as well as by the first displacement mentioned. The dash line D may represent the final position of the impression after the third displacement effected by the arms 78, 79, as well as by the first two displacements.

Although one specific embodiment of the invention has been particularly shown and described, it will be understood that the invention is capable of modification and that changes in the construction and in the arrangement of the various cooperating parts may be made without departing from the spirit or scope of the invention as expressed in the following claims.

What I claim is:

1. A check writer comprising a support for a check, an impression device movable to impress on the check the amount thereof and means operable upon each actuation of the device for angularly displacing the check support whereby successive impressions on the check will be disposed out of alinement with each other.

2. A check writer comprising a support for a check, an impression device movable to impress on the check the amount thereof and means operable upon each actuation of the device for irregularly displacing the check support whereby successive impressions on the check will be disposed out of alinement with each other.

3. A check writer comprising a support for a check, an impression device movable to impress on the check the amount thereof and means operable upon each actuation of the device for moving the check support to change the angle between the axis of the impression device and the longitudinal axis of the check support whereby successive impressions on the check will be disposed out of alinement with each other.

4. A check writer comprising a support for a check, an impression device including a roll having indicia thereon for impressing on the check the amount thereof, and means operable upon each actuation of the device for angularly displacing the check support whereby successive impressions on the check will be disposed out of alinement with each other.

5. A check writer comprising a support for a check, an impression device including a roll having indicia thereon for impressing on the check the amount thereof, and means operable upon each actuation of the device for irregularly displacing the check support whereby successive impressions on the check will be disposed out of alinement with each other.

6. A check writer comprising a support for a check, an impression device including a roll having indicia thereon for impressing on the check the amount thereof, and means operable upon each actuation of the device for moving the check support, thereby changing the angle between the axis of the impression device and the longitudinal axis of the check.

7. A check writer comprising a support for a check, an impression device including a roll having indicia thereon for impressing on the check the amount thereof, and means operable upon each actuation of the device for moving the check support, thereby changing the angle between the axis of the impression device and the path of movement of the check.

8. A check writer comprising a check support, an impression device movable to impress on the check the amount thereof and a plurality of means for angularly displacing the check support whereby successive impressions on the check will be disposed out of alinement with each other.

9. A check writer comprising a check support, an impression device movable to impress on the check the amount thereof and a plurality of independently operable means for angularly displacing the check support whereby successive impressions on the check will be disposed out of alinement with each other.

10. A check writer comprising a check support, an impression device movable to impress on the check the amount thereof and a plurality of means for irregularly displacing the check support whereby successive impressions on the check will be disposed out of alinement with each other.

11. A check writer comprising a support for a check, a rotatable impression device having indicia thereon for impressing on the check the amount thereof and means operable upon the rotation of the device for displacing the check support relative to the impression device whereby successive impressions on the check will be disposed out of alinement with each other.

12. A check writer comprising a support for a check, a rotatable impression device having indicia thereon for impressing on the check the amount thereof and means operable upon the rotation of the device for irregularly displacing the check support relative to the impression device whereby successive impressions on the check will be disposed out of alinement with each other.

13. A check writer comprising a support for a check, a rotatable impression device having indicia thereon for impressing on the check the amount thereof and means operable upon the rotation of the device for angularly displacing the check support relative to the impression device whereby successive impressions on the check will be disposed out of alinement with each other.

14. A check writer comprising a check support, a rotatable impression device movable toward the check support to impress on the check the amount thereof, means operable upon movement of the device toward the check support for displacing said support and means operable upon rotation of the impression device for displacing the check support whereby successive impressions on the check will be disposed out of alinement with each other.

15. A check writer comprising a check support, a rotatable impression device movable toward the check support to impress on the check the amount thereof, means operable upon movement of the device toward the check support for angularly displacing said support and means operable upon rotation of the impression device for displacing the check support whereby successive impressions on the check will be disposed out of alinement with each other.

16. A check writer comprising a check support, a rotatable impression device movable toward the check support to impress on the check the amount thereof, means operable upon movement of the device toward the check support for displacing said support and means operable upon rotation of the impression device for angularly displacing the check support whereby successive impressions on the check will be disposed out of alinement with each other.

17. A check writer comprising a check support, a rotatable impression device movable toward the check support to impress on the check the amount thereof, means operable upon movement of the device toward the check support for angularly displacing said support and means operable upon rotation of the impression device for angularly displacing the check support whereby successive impressions on the check will be disposed out of alinement with each other.

18. A check writer comprising a check support, a rotatable impression device movable toward the check support to impress on the check the amount thereof, means operable upon movement of the device toward the check support for irregularly displacing said support and means operable upon rotation of the impression device for displacing the check support whereby successive impressions on the check will be disposed out of alinement with each other.

19. A check writer comprising a check support, a rotatable impression device movable toward the check support to impress on the check the amount thereof, means including pawl and ratchet mechanism operable upon movement of the device toward the check support for displacing said support and means operable upon rotation of the impression device for displacing the check support whereby successive impressions on the check will be disposed out of alinement with each other.

20. A check writer comprising a check support, an impression device movable to impress on the check the amount thereof, check feeding mechanism including a feed roll and a pressure roll, means for moving one of said rolls away from the other roll, and means operable upon the actuation of said roll separating means for displacing the check support relative to the impression device in a manner to change the direction of the line of printing.

21. A check writer comprising a check support, an impression device movable to impress on the check the amount thereof, check feeding mechanism including a feed roll and a pressure roll, means for moving one of said rolls away from the other roll, and means operable upon the actuation of said roll separating means for angularly displacing the check support relative to the impression device whereby successive impressions on the check will be disposed out of alinement with each other.

22. A check writer comprising a check support, an impression device movable to impress on the check the amount thereof, check feeding mechanism including a feed roll and a pressure roll, means for moving one of said rolls away from the other roll, and means operable upon the actuation of said roll separating means for irregularly displacing the check support relative to the impression device whereby successive impressions on the check will be disposed out of alinement with each other.

23. A check writer comprising a check support, an impression device for impressing on a check the amount thereof, check feeding mechanism including a feed roll and a pressure roll, means for separating said rolls and means operable upon the actuation of said roll separating means and prior to the separation of said rolls for displacing the check support relative to the impression device whereby successive impressions on the check will be disposed out of alinement with each other.

24. A check writer comprising a check support, an impression device for impressing on a check the amount thereof, check feeding mechanism including a feed roll and a pressure roll, means for separating said rolls and means operable upon the actuation of said roll separating means and prior to the separation of said rolls for effecting relative angular displacement between said check support and said impression device whereby successive impressions on the check will be disposed out of alinement with each other.

25. A check writer comprising a check support, an impression device for impressing on a check the amount thereof, check feeding mechanism carried by said support and including a feed roll and a pressure roll, means for separating said rolls and means operable upon the actuation of said roll separating means and prior to the separation of said rolls for displacing the check support relative to the impression device whereby successive impressions on the check will be disposed out of alinement with each other.

26. A check writer comprising a check support, an impression device movable into engagement with a check for making an impression thereon, check feeding mechanism including a feed roll and a pressure roll, means for separating said rolls to admit a check therebetween, means operable upon the actuation of said roll separating means for displacing the check support and means operable upon the movement of said impression device to operative position for displacing said check support whereby successive impressions on the check will be disposed out of alinement with each other.

27. A check writer comprising a check support, an impression device movable into engagement with a check for making an impression thereon, check feeding mechanism including a feed roll and a pressure roll, means for separating said rolls to admit a check therebetween, means operable upon the actuation of said roll separating means for irregularly displacing the check support and means operable upon the movement of said impression device to operative position for displacing said check support whereby successive impressions on the check will be disposed out of alinement with each other.

28. A check writer comprising a check support, an impression device movable into engagement with a check for making an impression thereon, check feeding mechanism including a feed roll and a pressure roll, means for separating said rolls to admit a check therebetween, means operable upon the actuation of said roll separating means for irregularly displacing the check support and means operable upon the movement of said impression device to operative position for irregularly displacing said check support whereby successive impressions on the check will be disposed out of alinement with each other.

29. A check writer comprising a check support, an impression device movable into engagement with a check for making an impression thereon, check feeding mechanism carried by said check support and including a feed roll and a pressure roll, means for separating said rolls to admit a check therebetween, means operable upon the actuation of said roll separating means for displacing the check support and means operable upon the movement of said impression device to operative position for displacing said check support whereby successive impressions on the check will be disposed out of alinement with each other.

30. A check writer comprising a check support, a rotatable impression device, movable into engagement with a check for making an impression thereon, check feeding mechanism including a feed roll and a pressure roll, means for separating said rolls to admit a check therebetween, means operable upon the actuation of said roll separating means for displacing the check support, means operable upon the movement of said impression device to operative position for displacing said check support and means operable upon the rotation of said impression device for displacing said check support whereby successive impressions on the check will be disposed out of alinement with each other.

31. A check writer comprising a check support, a rotatable impression device, movable into engagement with a check for making an impression thereon, check feeding mechanism including a feed roll and a pressure roll means for separating said rolls to admit a check therebetween, means operable upon the actuation of said roll separating means for displacing the check support, and means operable upon the rotation of said impression device for displacing said check support whereby successive impressions on the check will be disposed out of alinement with each other.

32. A check writer comprising a check support, a rotatable impression device, movable into engagement with a check for making an impression thereon, check feeding mechanism including a feed roll and a pressure roll, means for separating said rolls to admit a check therebetween, means operable upon the actuation of said roll separating means for irregularly displacing the check support, and means operable upon the rotation of said impression device for irregularly displacing said check support whereby successive impressions on the check will be disposed out of alinement with each other.

In witness whereof, I have hereunto set my hand this 8th day of December, 1922.

HARRY T. SCHERMERHORN.